April 29, 1930. C. T. WESTLAKE Re. 17,655

LOCOMOTIVE TRAILER TRUCK

Original Filed April 4, 1925 2 Sheets-Sheet 1.

Inventor
Charles T. Westlake, deceased
by Commonwealth Steel Company, assignee

By Rodney Bedell
Attorney

April 29, 1930. C. T. WESTLAKE Re. 17,655

LOCOMOTIVE TRAILER TRUCK

Original Filed April 4, 1925 2 Sheets-Sheet 2

Inventor

Charles T. Westlake, deceased
by Commonwealth Steel Company, assignee

By Rodney Bedell
Attorney

Reissued Apr. 29, 1930

Re. 17,655

UNITED STATES PATENT OFFICE

CHARLES T. WESTLAKE, DECEASED, LATE OF ST. LOUIS, MISSOURI, BY COMMONWEALTH STEEL COMPANY, OF GRANITE CITY, ILLINOIS, ASSIGNEE, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE TRAILER TRUCK

Original No. 1,675,679, dated July 3, 1928, Serial No. 20,832, filed April 4, 1925. Application for reissue filed August 17, 1929. Serial No. 386,625.

This invention relates to a new and useful improvement in locomotive trailer trucks and more particularly to the bearings which transfer a portion of the load carried by the locomotive frame to the trailer truck.

The object of the invention is to provide a rocker bearing at the rear of the trailer truck that will perform all the functions customary for this member and act as a centering means so that the trailer truck will truly follow and be aligned with the driving wheels.

Another object is to provide a method of aligning the various members of the trailer truck so that there will be no tendency for the trailer truck not to truly follow the driving wheels under ordinary conditions.

With these and other objects in view, the invention consists in certain novel features of construction and arrangement of parts, hereinafter more fully described and claimed, and illustrated in the accompanying drawings, in which—

Figure 4 is in part an end elevation and in part a sectional view of the rocker bearing.

Figure 1:
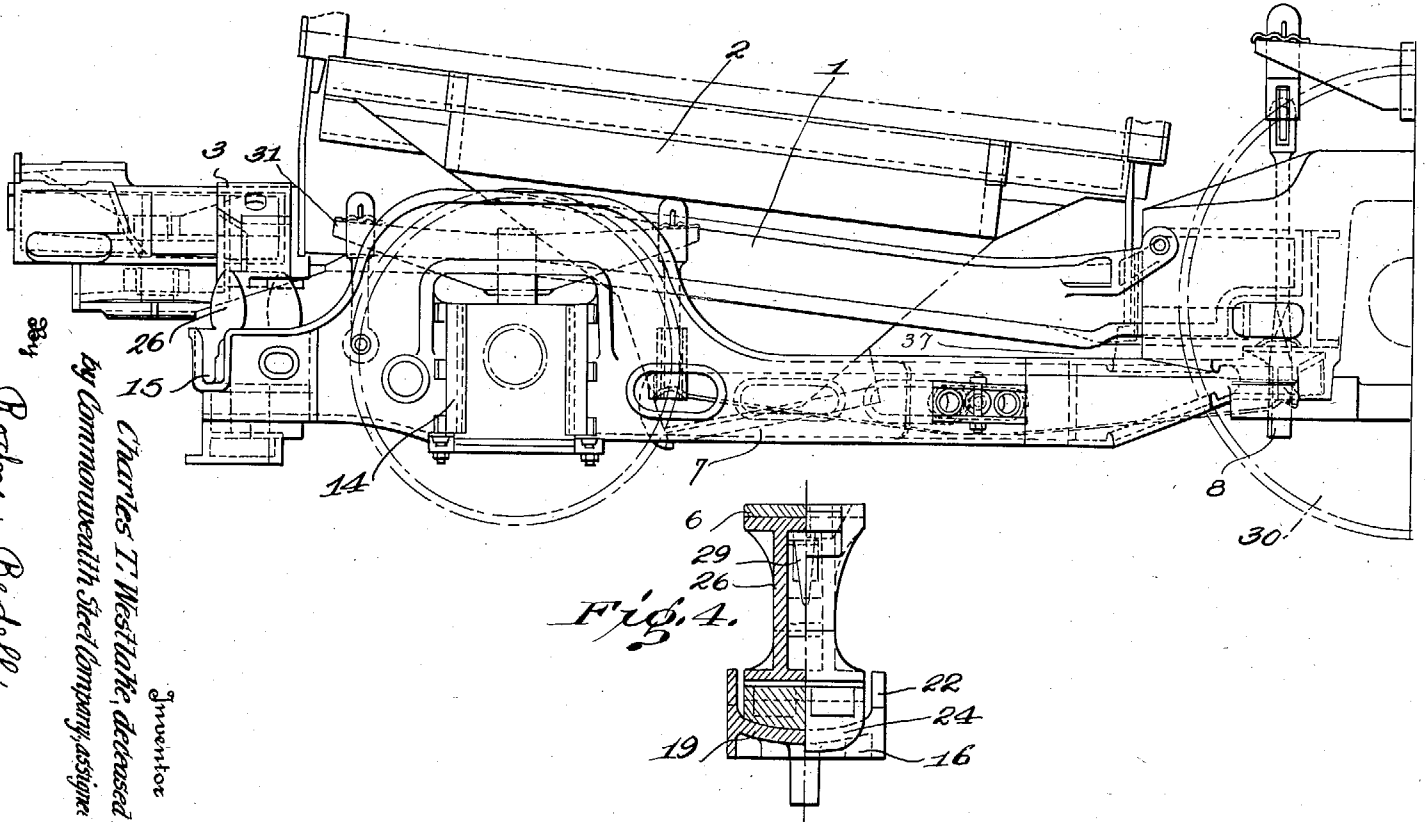
Figure 1 is a side view of the trailer truck and the cradle portion of the locomotive frame.
Figure 2:
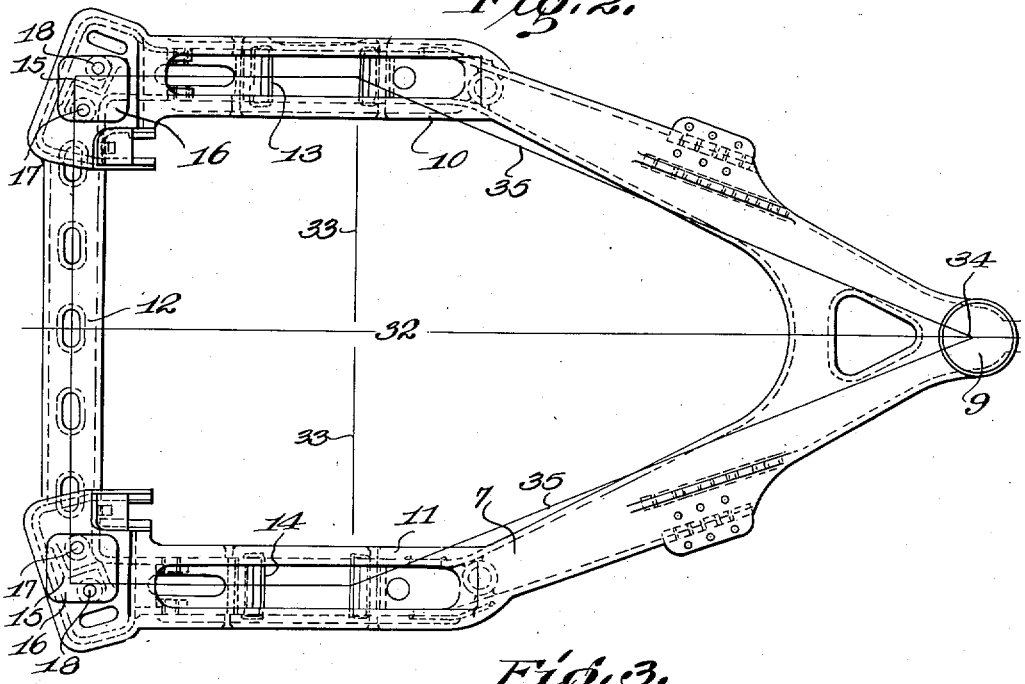
Figure 2 is a top plan view of the trailer truck.

The numeral 1 in the drawings indicates the cradle portion of a locomotive frame providing for the usual ash pan 2. Side bearing arms 3 are preferably formed integrally with the cradle. Two depending lugs or projections 4 and 5 are located on the undersurface of the side bearing arms. Between these lugs a bearing plate 6 is fixed. The underside of the bearing plate is divided into two inclined portions sloping downwardly from the center. 7 is a trailer truck frame pivotally connected to the forward end of the locomotive cradle by a pin 8 through a ball and socket or universal connection 9.

The trailer truck frame is of customary wish-bone construction in that it comprises side members 10 and 11, end member 12, and pedestals 13 and 14. The truck frame is supported in a well known manner by the truck spring 31 and the equalizing lever 38 and links 39 whereby the truck load is equalized with the main frame spring system, the rear end of which is indicated by the rear driver spring 40. The corners of the trailer truck are depressed at 15 forming pockets. The top surfaces of the pockets are provided with slightly raised and finished surfaces 16 having holes 17 and 18 drilled therethrough. A rocker seat bearing 19 having dowels 20 and 21 as parts thereof is adapted to be positioned on the finished surface 16 and held in place by placing the dowels 20 and 21 through holes 17 and 18 in this finished surface. Upstanding sides 22 are provided on the rocker seat bearing. The rocker seat 23 rests on the rocker seat bearing and is held against displacement by overlapping ends 24 and by the upstanding sides 22 of the rocker seat bearing.

Two parallel grooves or sockets 25 are equidistantly spaced from the center of the top surface of the rocker seat. A rocker member 26 is provided on the bottom with two spaced cylindrical members 27 adapted to seat in the parallel grooves 25. This rocker, while formed in one continuous piece, has its top surface equally divided into two curved portions, both being arcs of equal length and struck from equal radii but from different centers. Openings 28 are provided in the top surface of the rocker on either side of the center. The rocker 26 supports the bearing plate 6 which is provided on each of its inclined undersurfaces with a depending tapered lug 29. These lugs are adapted to pass through the openings 28 in the rocker and maintain the proper relation between the parts.

It is preferable in the adaptation of the centering means to arrange the rocker and its correlated parts so that their longitudinal center line is tangent to an arc struck from the ball and socket connection 9 between the trailer truck and the cradle of the locomotive through the center of the rocker. To obtain this arrangement, the ends of the bearing plates 6 are diagonally cut and the dowels of the rocker seat bearing are positioned to align this member with the bearing plate.

In the operation of the improved trailer truck it is to be understood that there is a complete rocker bearing assembly on each of the corners 15 of the trailer truck. When the locomotive is traveling along a straight track, the normal position is that shown by the full lines in Figure 3 with the peak of the rocker 26 resting in the angle formed by the inclined portions of the undersurface of the bearing plate 6. Both cylindrical members 27 of the rocker rest in their sockets 25. Upon entering a curve, the driving wheels 30 of the locomotive deviate from the line of travel and swing the cradle with them. Supposing this curve to be to the left, the cradle would move to the right relative to the trailer truck and produce a position of the parts in the rocker bearing assembly as shown by the dotted lines in Figure 3. The rocker 26 is tilted so that it now is supported by only one of the off-centered cylindrical members 27, and the lugs 29 prevent the bearing plates 6 from sliding over the rocker. This results in either lifting the cradle or compressing the springs 31, or both, to increase the distance between the trailer truck and the cradle. Hence, the inclined undersurfaces of the bearing plates tend to increase the load on the trailer truck. Upon regaining the straight track, the additional load which was temporarily placed upon the trailer truck tends by gravity to realign the trailer truck with the driving wheels. The upper surface of the rocker seeks the highest point of the inclined surface of the bearing plate and the load tends to turn the rocker on its single pivot point until the second cylindrical member 27 seats in its socket when further movement, due to the track curving to the right and the resulting shifting of pivot points and the opposite slope of the bottom surface of the bearing plate would again increase the distance between the cradle and the trailer truck and increase the load on the truck.

The action of the rocker in increasing the distance between the trailer truck frame and the locomotive cradle changes the angle 37 formed by these members, and consequently the relation between the bearing plate 6 and the rocker seat bearing 19 is changed. To compensate for this and prevent the rocker 26 from having only partial contact with the bearing plate 6, the top surface of the rocker seat bearing is concavely curved transversely of the direction of movement of the rocker. The undersurface of the rocker seat 23 is correspondingly convexly curved so that the rocker and rocker seat may move as a unit in the socket thus formed and at all times maintain a maximum contact between the rocker and the bearing plate. The upstanding sides 22 of the rocker seat bearing limit this movement and prevent any misalignment between the rocker and rocker seat.

In assembling the improved trailer truck it is frequently found that inequalites in the steel, irregular shrinkage, errors in the mold assembly, and various other causes produce slight distortions which may cause undue flange wear on the trailer truck wheels and consequently produce an unnecessary load on the locomotive.

To insure proper alignment of the trailer truck wheels with the driving wheels of the locomotive, a longitudinal center line 32 is established. Measurements taken from the line 32 along line 33 and a predetermined measurement found by experiment in practice from the pivot point of the trailer truck at 34 along line 35 establish the proper location of the front faces of the pedestals which are machined as determined by the above measurements. The location of the rocker seat bearing 19 is established by measurements taken from the longitudinal center line 32 and from the finished surfaces of the pedestals and the holes 17 and 18 are drilled accordingly.

Each pair of holes 17 and 18 is so located that the longitudinal center line of the bearing assembly will be tangent to an arc drawn from the pivot point of the trailer truck.

The principal precaution necessary in making these aforementioned measurements is that each of the pair of pedestals must be located the same distance from the longitudinal center line and the same distance from the pivot point of the trailer truck. The same is true of the location of the holes 17 and 18. They must be equidistant from the longitudinal center line and equidistant from the finished surfaces of the pedestals.

Figure 3:
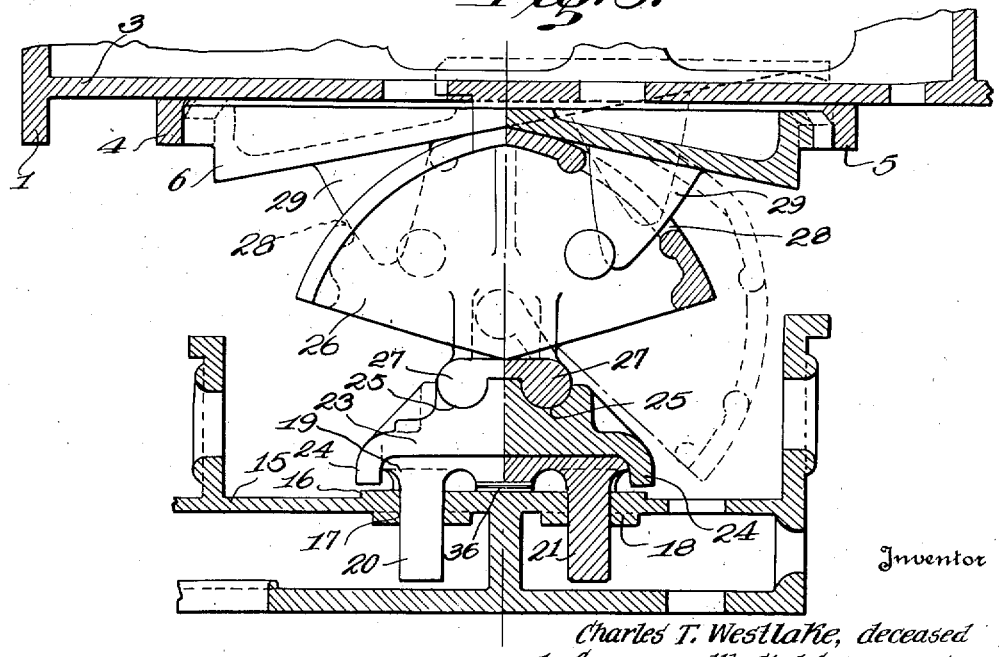
Figure 3 is in part a side elevation and in part a sectional view of the rocker bearing and its connections.

The improved method of locating the essential elements of the trailer truck enables quantity production without individual fitting of each piece with the assurance that the assembled structure, when attached to a locomotive, will truly follow the driving wheels with minimum resistance and that when following the driving wheels along a straight track the distance between the cradle and the trailer truck will be constant and the parts normally as shown by the full lines in Figure 3. Shims 36 may be placed under the rocker seat bearing 19 in order to adjust the height of the cradle relative to the truck and thereby put the desired load upon the trailer truck as it is to be understood that in the present structure the distance between the trailer truck and cradle determines the load carried by the trailer truck and provides for the proper equalization and loads on the axles.

It is obvious that minor changes in the size, form and construction of the various parts of the improved trailer truck can be made and substituted for those herein shown and described, without departing from the spirit of the invention as expressed in the following claims.

What is claimed is—

1. A locomotive having a cradle and a trailer truck connected thereto, a bearing between said cradle and said trailer truck, and means as a part of said bearing for regulating the normal load of said trailer truck.

2. A locomotive having a cradle and a trailer truck connected thereto, and a bearing between said cradle and said trailer truck, said bearing provided with means to determine the normal load of said trailer truck.

3. A locomotive having a cradle and a trailer truck connected thereto, a bearing between said cradle and said trailer truck, said bearing comprising a curved face rocker pivotally mounted, a bearing plate mounted on said cradle adapted for contact with said bearing, and lugs on said bearing plate engaging said rocker.

4. The method of making a trailer truck frame, which frame includes converging side members terminating in a socket, pedestals formed integrally with said side members, an end member, bearing pockets in each corner of the frame, and bearings adapted to be placed in said pockets, which method consists in first finishing the inner surfaces of the pedestals at right angles to an established longitudinal center line equidistant from said longitudinal center line and from said socket, and then drilling holes in the finished surface of said corner pockets, said holes being so arranged as to carry the bearings adapted to fit therein equidistant from said longitudinal center line and equidistant from the finished surfaces of the near pedestal.

5. The method of making a trailer truck frame, which includes converging side members terminating in a socket, pedestals formed integrally with said side members, an end member, bearing pockets in each corner of the frame, and bearings adapted to be placed in said pockets, which method consists in first finishing the inner surfaces of the pedestals at right angles to an established longitudinal center line equidistant from said longitudinal center line and from said socket, and then drilling holes in the finished surface of said corner pockets, said holes being so arranged as to carry the bearings adapted to fit therein equidistant from said longitudinal center line, tangent to an arc struck from the said socket.

6. The method of making a trailer truck frame of the wish-bone type, which frame includes converging side members terminating in a socket, said side members having pedestals as parts thereof, an end member, bearing pockets, and bearings which method consists in drilling holes in said pockets to mount each of said bearings at equal angles to and equidistantly from the longitudinal center line to insure proper tracking of the trailer truck.

7. A locomotive having a cradle and a trailer truck connected thereto, a bearing between said cradle and said trailer truck, said bearing comprising a curved face rocker pivotally mounted, a bearing plate mounted upon said cradle adapted for contact with said bearing, and lugs on said bearing plate, at least one of which is always in engagement with said rocker.

8. In combination, a railway vehicle body frame, a truck frame pivotally connected to said body frame, and a rocker device on said truck frame supporting said body frame at a point spaced longitudinally of the vehicle from the pivotal connection, said device including an element adapted to rock transversely and longitudinally of the vehicle.

9. In combination, a railway vehicle body frame, a truck frame pivotally connected to said body frame, and a rocker device on said truck frame supporting said body frame at a point spaced longitudinally of the vehicle from the pivotal connection, said device including an element adapted to rock transversely of the vehicle about one pivot and longitudinally of the vehicle about another pivot.

10. In combination, a railway vehicle body frame, a truck frame pivotally connected to said body frame, and a rocker device on said truck frame supporting said body frame at a point spaced longitudinally of the vehicle from the pivotal connection, said device being adapted to pivot transversely and longitudinally of the vehicle, a member between said rocker and said body frame, and elements on said rocker and member for positively maintaining horizontal engagement thereof.

11. In a locomotive, a body frame, a truck frame pivoted to said body frame, and a rocker centering device including parts secured to said body frame and to said truck frame respectively and comprising a seat and a rocker having spaced pivots on said seat, said rocker and seat being adapted to rock as a unit transversely of the plane of rocking movement of said rocker on said seat.

12. In a locomotive, a cradle, a trailer truck connected to said cradle, a centering device between said cradle and trailer truck, said device comprising a base member for rigid application to a truck, a rocker seat having a single bearing on said base so as to pivot thereon in one plane, a rocker having spaced bearings on said seat so as to pivot thereon in a plane extending transversely of said first mentioned plane and an element resting on said rocker for rigid application to body structure to be carried by said truck.

13. In a locomotive, a cradle, a trailer truck connected to said cradle, a centering device between said cradle and trailer truck, said device comprising a base member for rigid application to a truck, a rocker seat mounted on said base member so as to pivot thereon in an upright plane, a rocker pivoted about a predetermined axis on said seat so as to tilt thereon in an upright plane extending transversely of said first mentioned plane, an element resting on said rocker for rigid application to said cradle, and interengaging parts on said rocker and element for maintaining desired relation between them.

14. In combination, a railway vehicle body frame, a truck frame pivotally connected to said body frame, a centering device rocker mounted on said truck frame, and a rocker supported centering device member mounted on said body frame; said rocker and member having interengaging load-transferring faces, and elements extending from said member face through said rocker face for engaging said rocker and maintaining interengagement between said rocker and member.

Subscribed this 17th day of July, 1929.

COMMONWEALTH STEEL COMPANY,
*Assignee of Charles T. Westlake, deceased.*
By H. M. PFLAGER,
*Senior Vice-President.*